July 19, 1960 G. A. BALCOM ET AL 2,945,531
APPARATUS FOR MAKING A REINFORCED FIBER GLASS TUBE
Filed Jan. 8, 1958 4 Sheets-Sheet 1

INVENTORS
GEORGE A. BALCOM
ARTHUR J. WILTSHIRE
BY
W. G. Sullivan
ATTORNEY

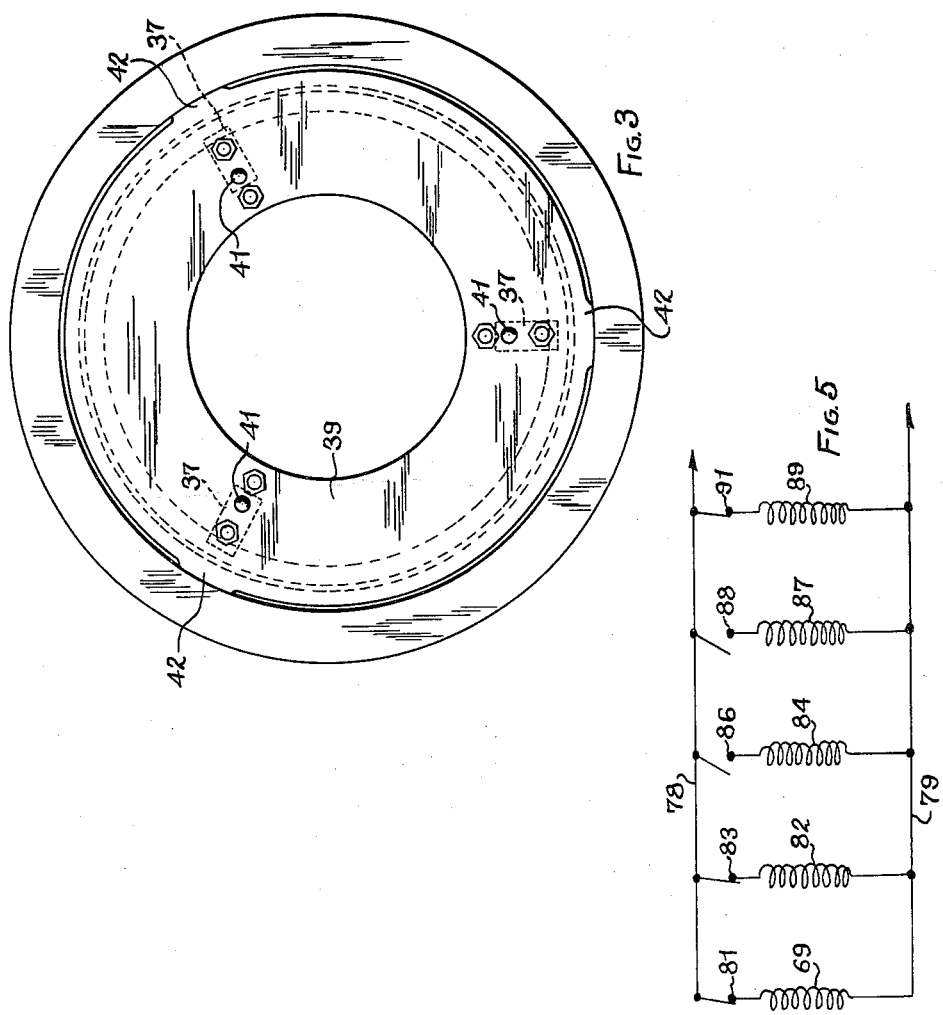

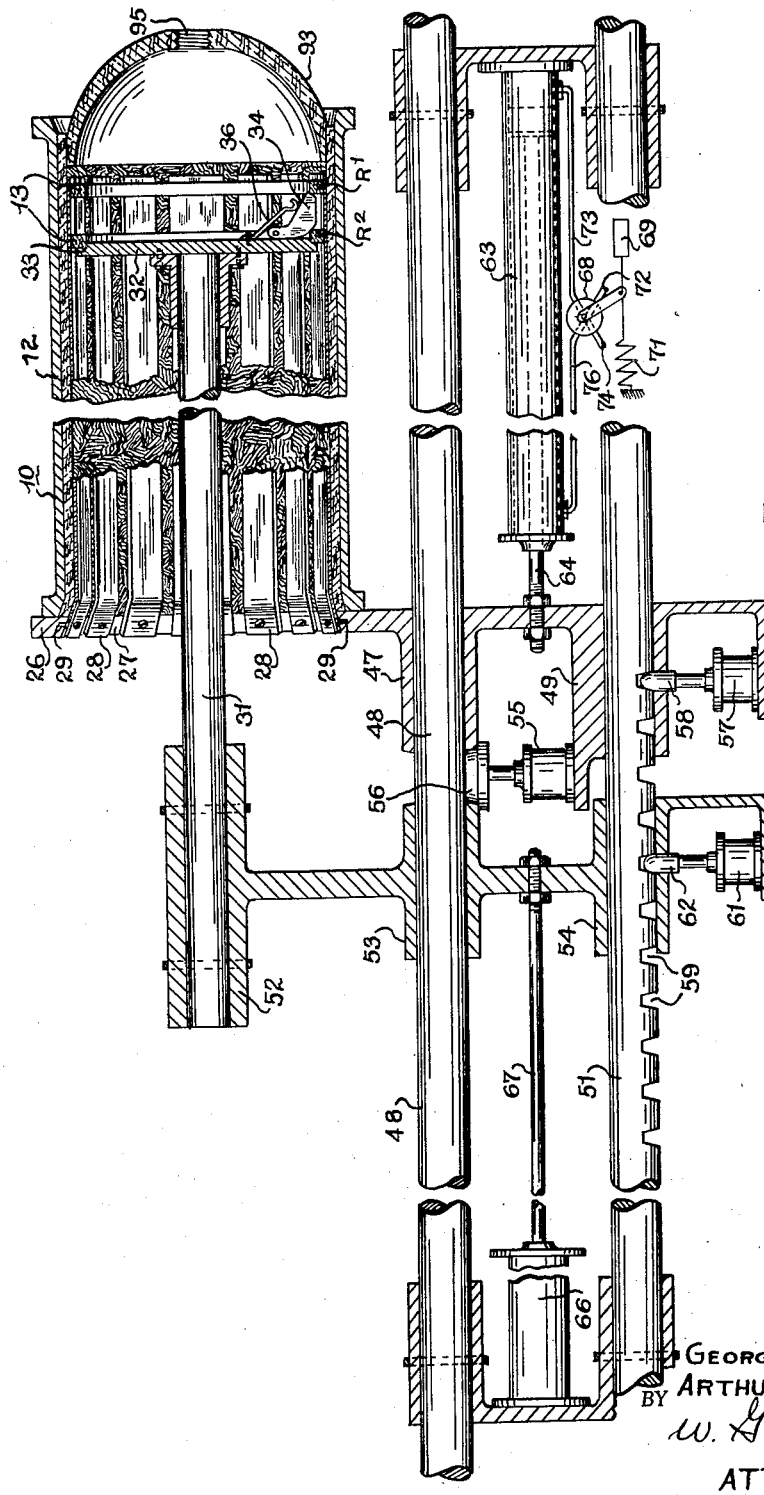

July 19, 1960 G. A. BALCOM ET AL 2,945,531
APPARATUS FOR MAKING A REINFORCED FIBER GLASS TUBE
Filed Jan. 8, 1958 4 Sheets-Sheet 4
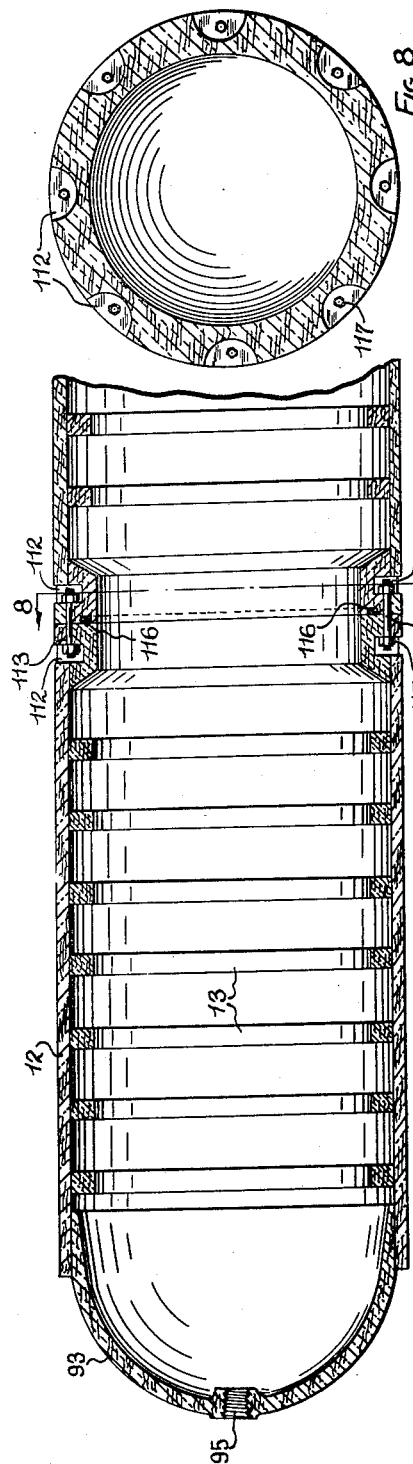
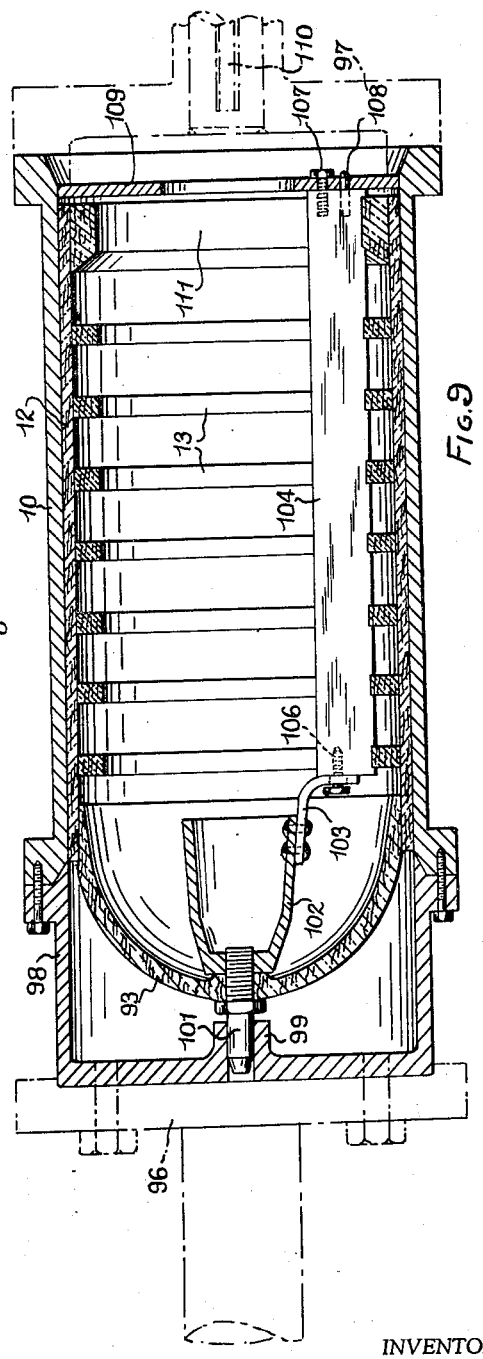
INVENTOR.
GEORGE A. BALCOM
BY ARTHUR J. WILTSHIRE
ATTORNEY United States Patent Office 2,945,531
Patented July 19, 1960

2,945,531

APPARATUS FOR MAKING A REINFORCED FIBER GLASS TUBE

George A. Balcom, Cleveland, and Arthur J. Wiltshire, Richmond Heights, Ohio, assignors to White Sewing Machine Corporation, Lakewood, Ohio, a corporation of Delaware Filed Jan. 8, 1958, Ser. No. 707,801

5 Claims. (Cl. 154—1)

This invention relates to fiber glass tubes or tanks, and more particularly to a fiber glass tube or tank which is internally reinforced to withstand relatively high external pressure. The invention further relates to a method and apparatus for forming a tube or tank of this type.

Articles formed of fiber glass and a bonding agent have been in increasing demand due to well recognized advantages such as a high strength-weight ratio, resistance to corrosion and electrical transparency which is important for certain applications.

We are aware that it has previously been suggested to form fiber glass tubes by disposing fiber glass mat or the like within a cylindrical shell and rotating the shell at relatively high speed to compact the fiber glass, supplying heat hardenable liquid resin to the shell concurrently with rotation thereof whereby the resin is forced into the mat by centrifugal force and applying heat during rotation of the shell to harden the resin. Tubes formed in this manner have proven successful for various applications including use in tanks subjected to internal pressure. In the event a tube or tank of this type is to be subjected to external pressure it is apparent that axially spaced circular internal ribs will greatly increase the resistance of the tube to collapse. It is desirable that the ribs not only be formed of fiber glass but that the ribs be securely bonded to the tube and locked in axially spaced relation therewith without the use of supplemental spacing means. This is effected by bonding the ribs to the tube and interfitting the ribs and tube during formation of the tube or partially embedding the ribs in the tube.

According to the invention, we first form fiber glass circular ribs from a substantially continuous strand of fiber glass and a bonding agent. The ribs are preferably generally square in cross section and have considerable resistance to distortion due to external pressure. A mat of fiber glass of desired thickness is arranged in generally cylindrical form within a rotatable metal tube. The tube is first rotated to compact the fiber glass and after compacting a plurality of thin rectangular metal fingers are disposed against the inner wall of the compacted fiber glass to provide a guide sheath for the ribs. The first and second ribs are then forced along the sheath from one end of the tube to a zone adjacent the opposite end and in desired spaced relation. The ribs are held fixed in position while the sheath is retracted a sufficient distance to leave the first rib in contact with the fiber glass tube. The second rib holds the sheath end portions in contact with the mat while the third rib is positioned and held fixed. The sheath is then further retracted to leave the second rib in direct contact with the fiber glass mat and the process is continued until all the ribs are in desired axially spaced position in contact with the mat and the sheath has been withdrawn from the tube or mold. A plurality of spacing bars are then used to hold the ribs in position and detachable circular flanges are disposed at each end of the tube abutting the mat.

The tube is then rotated at relatively high speed while liquid resin is fed axially along the mat. Centrifugal force causes the resin to be forced into the mat and heat is concurrently applied. After a pre-determined period the resin hardens forming a high strength fiber glass with the ribs firmly bonded to the tube and slightly embedded therein. It is contemplated that a generally cup shaped end can be pre-formed and molded to the fiber glass tube concurrently with molding of the ribs thereto. We have found that a fiber glass tube or tank formed as described has the following advantages relative to a metal tube; it has considerably less weight for a given capacity and resistance to externally applied fluid pressure or the like, it is resistant to corrosion, it is electrically transparent, and it can be economically made.

It is a primary object of the invention to provide a generally cylindrical form tank which for a given capacity and resistance to external pressure is relatively light in weight, corrosion resistant and electrically transparent.

Another object of the invention is to provide a tube or tank formed of fiber glass which has internally disposed fiber glass reinforcing ribs.

Another object of the invention is to provide apparatus for forming a tube or tank of the above type.

Another object of the invention is to provide a method of forming a tube or tank of the above type.

Other objects of the invention and the invention itself will become increasingly apparent from a consideration of the following description and drawings wherein:

Figure 3 is an end elevational view of the right end flange shown in Figure 1;

Figure 4 is a sectional view of a ring we may employ for forming the fiber glass ribs;

Figure 5 is a wiring diagram showing solenoids and switches we may employ for controlling fluid valves;

Figure 6 is a diagrammatic view, largely in section, showing mechanism we may use for positioning fiber glass ribs in a cylinder of fiber glass mat;

Figure 7 is a longitudinal sectional view showing a fiber glass tank embodying the invention;

Figure 8 is a transverse section taken along the line 8—8 of Figure 7; and

Figure 9 is a sectional view of a tank half section disposed in a molding tube.

Figure 1:
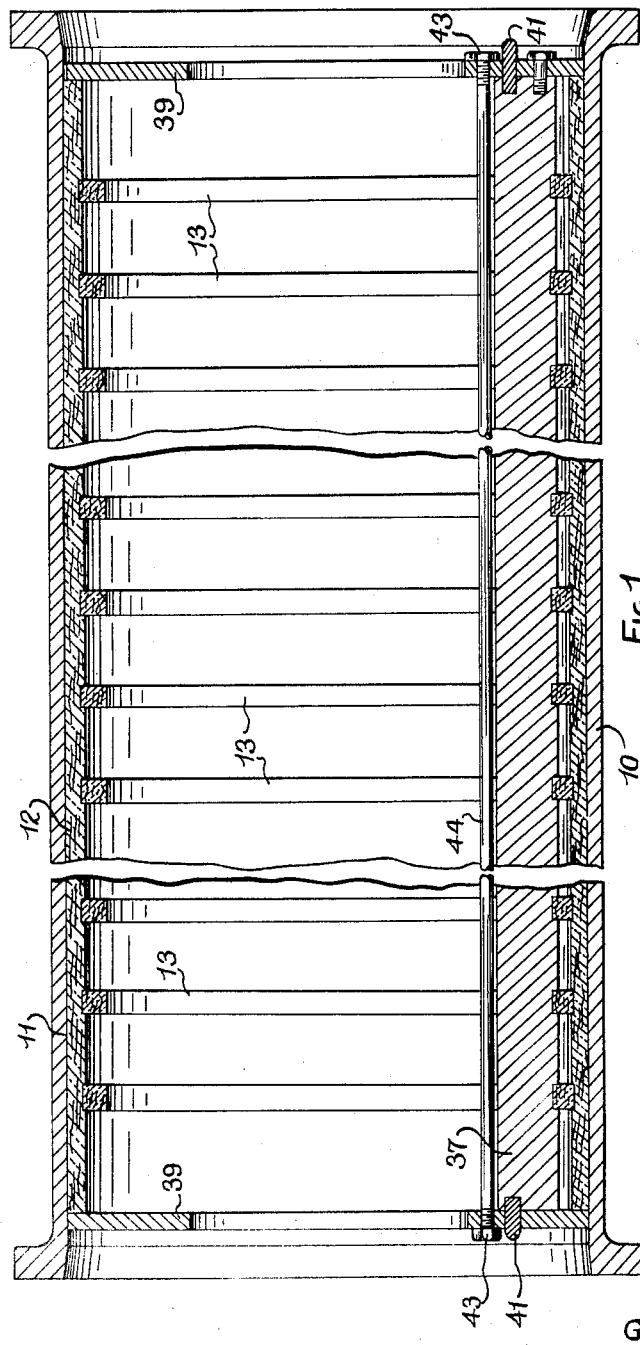
Figure 1 is a longitudinal sectional view of a rotatable molding tube which we may employ with fiber glass mat, fiber glass ribs, spacing bars and end flanges disposed therein.
Figure 2:
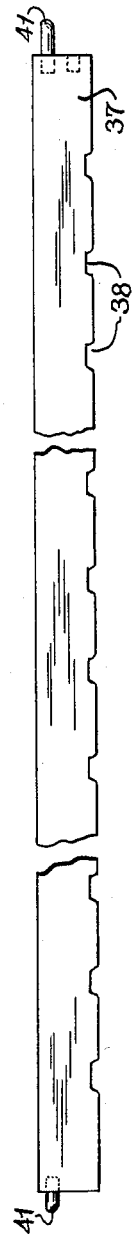
Figure 2 is an elevational view of a spacing bar shown in Figure 1.

Referring now to the drawings and particularly Figures 1 to 4 inclusive, we have indicated generally at 10 a metal cylinder or molding tube used for centrifugal casting of the fiber glass tube or tank. The tube 10 is mounted for rotation with a minimum of vibration about its axis, preferably by providing axially spaced roller bearings engaging the external wall of the tube and an external flange at the left hand portion of the tube serving as a driving pulley. The manner of mounting and rotating tube 10 constitutes no essential part of the present invention and these details are not shown. The tube has a highly polished inner wall 11 and for ease in removing the cast fiber glass tube a suitable lubricant may be applied to wall 11 before the fiber glass mat or the like 12 is disposed within tube 10 although the slight natural shrinkage of the cast tube normally permits easy removal. Dependent upon the desired thickness of the cast wall fiber glass mat usually in several layers is disposed within tube 10 for a suitable length. Tube 10 is then rotated at a speed sufficient to compact the fiber glass mat and in some cases a solvent such as acetone for the binder applied to the glass during manufacture may be supplied at this stage to soften the binder and aid the compacting step. The mat for this application is preferably of the random lay type and for a tube having an internal diameter such as twenty inches twelve layers of the thickness supplied may be used for the tube wall. As an illustration, the tubes may be of varying diameters and lengths such as from five inches to thirty inches internal diameter and from ten inches to two hundred inches in length. Mat of proper length is wound around a mandrel to provide the desired layers and upon removal from the mandrel is manually inserted within tube or mold 10.

Referring to Figure 4, the manner of forming the fiber glass ribs 13 will now be described. A ring generally indicated at 14 comprises a disc form portion 16 provided with a hub 17 and a complementary disc form portion 18 adapted to be detachably secured to portion 16 as by bolts 19. A peripheral groove 21 having slightly diverging side walls in a radially outward direction is formed between portions 16 and 18, the portions preferably having a step shouldered flange and recess engagement for accurate alignment as indicated at 22. Radially inwardly of groove 21 portion 18 is formed with a circumferentially extending slot 23 to receive an O ring or the like forming a seal at this zone. Hub 17 is secured to a drive shaft for rotation of ring 14 and a fiber glass strand comprising a plurality such as thirty ends or rovings has its free end secured to the base of groove 21. The strand in passing to ring 14 has a bonding agent such as liquid polyester resin applied thereto and the ring is rotated while the strand is fed thereto by a level wind mechanism whereby successive layers of windings are applied extending between the side walls of groove 21. In other words, abutting strand windings are applied from left to right to form one layer and continued from right to left to form the succeeding layer. After sufficient layers have been applied the ring and windings are disposed in a bake oven or the like and the resin is cured at a temperature such as 225° F. for thirty minutes. The ring portions 16 and 18 are then separated and the finished rib 13 is removed. The seal 23 prevents liquid resin from penetrating to any extent between the ring portions during winding and curing. This provides a strong reinforcing rib since it is formed from a continuous or substantially continuous strand of high tensile strength fiber glass. It is understood that in practice several ribs would be concurrently wound and cured.

Referring to Figure 6, we have provided mechanism for positioning ribs 13 in contact with the inner surface of the compacted fiber glass mat 12. Said mechanism includes an axially movable shim carrier having a flange 26 formed with a circular opening 27. Secured to the wall of opening 27 are a plurality of shims 28 as by screws 29. The shims are of rectangular shape and are preferably formed of stainless steel about .005 inch thick. The width of the shims will vary with the diameter of the fiber glass tube or tank and for a tube having an internal diameter of twenty inches the shims may be about three inches wide with a gap therebetween of about one-eighth inch. The shims are flexible whereby they can be positioned within the inner surface of mat 12 for a desired distance or until flange 26 abuts the flanged left end of tube 10 (Figure 6). The mechanism also includes an axially movable rib carrier having a shaft 31 to which a flange 32 is secured. The flange is disposed at the right end of shaft 31 and has a step-shouldered peripheral recess 33 forming a seat for ribs 13. In positioning the ribs the flange 32 is initially disposed to the left of shim carrier flange 26 and the rib 13 to be positioned at the extreme right is seated on the flange and retained by one or more pawls 34 pivotally connected to flange 32 and pressed towards an outward position by a leaf spring 36. Flange 32 is then forced to the right until the rib 13 mounted thereon is moved to a desired position indicated at $R_1$. This rib holds the free ends of the shims 28 in tight contact with the inner surface of fiber glass mat 12.

Flange 32 is then retracted to the left to clear flange 26 and a second rib 13 is seated thereon and forced to the position indicated at $R_2$. In this position the pawls 34 engage the first positioned rib indicated at $R_1$. While flange 32 remains fixed the shim carrier flange 26 is moved to the left a sufficient distance to withdraw the right hand end portions of the shims from contact with the rib at $R_1$ and permit this rib to directly engage mat 12. This process of alternately positioning a rib and retracting the shim carrier to the left is repeated until all the ribs are positioned and the shims are clear of tube 10. A plurality of relatively narrow spacing bars 37, such as three, provided with notches 38 spaced in accordance with the spacing of ribs 13 are slipped over radially inwardly extending portions of the ribs and in equally spaced relation circumferentially. End flanges 39, preferably formed of aluminum, are then projected axially inwardly from each end of tube 10 to receive aligning pins 41 extending from each end of bars 37. For ease in positioning end flanges 39 raised portions 42 are provided at circumferentially spaced points which contact the inner wall of tube 10. The bars are locked in position with flanges 39 by nuts 43 engaging tie rods 44. The tube 10 is then rotated at relatively high speed while liquid resin is being supplied to mat 12 by moving a slotted or perforated pipe axially back and forth within tube 10 to distribute the resin. During rotation of tube 10 heat is applied to harden the resin.

A detailed description of the preferred means for effecting movement of the shim carrier including the spider or flange 26 and the rib carrier including flange 32 will now be given. Flange 26 of the shim carrier has a hub 47 by which it is slidably mounted on a fixed shaft 48 and a hub 49 by which it is slidably mounted on a fixed parallel shaft 51. Shaft 31 on which the rib carrier flange 32 is mounted is fixed to and supported at its opposite end by a hub 52 which is connected by a flange to a hub 53 slidable on fixed shaft 48 and a hub 54 slidable on fixed shaft 51. Carried by flange 26 is an air cylinder 55 adapted to interpose a spacing plug 56 between hubs 47 and 53 and an air cylinder 57 adapted to lock flange 26 with fixed shaft 51 through a detent 58 engaging one of a plurality of notches 59 cut in shaft 51. In like manner an air cylinder 61 is adapted to prevent axial movement of rib carrier shaft 31 by locking a detent 62 with one of the notches 59. An air cylinder 63 has its stem 64 operably connected to shim carrier flange 26 and an air cylinder 66 has its stem 67 operably connected to the flange connecting hubs 52, 53 and 54. Each of the air cylinders 55, 57, 61, 63 and 66 has its piston and attached stem operated in a conventional manner through a solenoid controlled four way valve whereby energizing of the solenoid will supply air under pressure to one side of the piston and exhaust air from the opposite side thereby causing the piston to move in a given direction. This arrangement is illustrated in connection with air cylinder 63 wherein the four way valve 68 operable by solenoid 69 and spring 71 is adapted to selectively connect air supply line 72 with cylinder line 73 and air exhaust line 74 with cylinder line 76 or supply line 72 with cylinder line 76 and exhaust line 74 with cylinder line 73.

Referring to the wiring diagram (Figure 5) a pair of power leads are indicated at 78 and 79 with five solenoids and associated switches connected in parallel across the leads. Solenoid 69 and switch 81 control air cylinder 63 whereby when switch 81 is closed the shim carrier or flange 26 will be moved to the right and when switch 81 is open the shim carrier will be moved to the left. Solenoid 82 and switch 83 control operation of the shim carrier locking cylinder 57 whereby when switch 83 is closed the detent 58 will engage a notch 59 to lock the shim carrier and when switch 83 is open the carrier may move. Solenoid 84 and switch 86 control the operation of the rib carrier cylinder 66 whereby when switch 86 is closed flange 32 will move to the right and when switch 86 is open the flange will move to the left. Solenoid 87 and switch 88 control operation of air cylinder 61 whereby when the switch is closed the rib carrier is locked and when the switch is open the carrier may move. Solenoid 89 and switch 91 control operation of air cylinder 55 whereby when the switch is closed spacing plug 56 is interposed between the shim carrier and rim carrier and when the switch is open the hubs 47 and 53 may abut.

Referring to Figure 1, by selectively operating switches 81, 83, 86, 88 and 91 the ribs 13 can be positioned as illustrated and the shim carrier and rib carrier moved to the left out of contact with the mold tube 10 and fiber glass cylinder 12. The ribs 13 are then locked in spaced position by the spacing bars 44 and end flanges 39 as illustrated. The ribs 13 are partially embedded in the fiber glass cylinder 12 as the shims 28 are removed. Tube 10 is then rotated at relatively high speed, such as 1000 r.p.m., and while rotation continues a thermosetting resin in liquid form is fed to the fiber glass cylinder 12 preferably by means of a perforated pipe moved axially within the cylinder. Centrifugal force causes the resin to penetrate the fiber glass cylinder and be substantially uniformly distributed therein. Concurrently with rotation of tube 10 it is heated in any suitable manner as by providing an encasing hood (not shown) and heat lamps or the like. The heat conducted through tube 10 hardens the resin thereby forming a rigid fiber glass tube having the ribs 13 bonded thereto and partially embedded therein whereby the ribs are firmly locked in a desired axially spaced relation. The foregoing relates to formation of a fiber glass tube having internal fiber glass reinforcing ribs but the same apparatus can be used for forming a fiber glass tank.

Referring to Figures 1, 7, 8 and 9 we have illustrated a generally cup shaped fiber glass cap. The end cap 93 is formed in a conventional manner by making a pre-form of relatively short length fiber glass in a random lay pattern, disposing the pre-forming and liquid thermosetting resin between cooperating mold parts and subjecting the mold parts to heat and pressure to harden the resin and mold the end cap. The end cap is provided with a threaded opening 95. In this case the shims 28 are initially positioned somewhat more to the right and the molded end cap is forced into position with the shims as a guide sheath whereby when the sheath is withdrawn the end cap will be in firm contact with the fiber glass cylinder 12.

Referring to Figure 9 the manner of holding cap 93 in position during rotation of tube 10 is shown. Tube 10 and the enclosed fiber glass cylinder 12, the ribs 13 and end cap 93 are positioned between the drive element 96 and an axially aligned support element 97 similar to the head and tail stock of a lathe. A cup shaped drive member 98 is detachably secured to drive element 96 and one end flange of tube 10. Member 98 has a central hub 99 which receives a pin 101, the opposite end of the pin being projected through cap opening 95 and threadedly engaging a centering member 102. Generally L shaped brackets 103 secured to member 102 are adapted to be pivotally connected to rib spacing bars 104 by bolts 106 whereby the bars can be rotated into position to engage ribs 13 and locked by a bolt 107 and a pin 108 extending from an end flange 109 at the opposite end of tube 10. With the parts in the position shown in Figure 9 tube 10 is rotated and a resin supply line 110 movable axially through the hub of support element 97 supplies liquid resin to the fiber glass cylinder. Concurrently with rotation of tube 10 it is heated to harden the resin to secure ribs 13 to the cylinder as previously described and to bond end cap 93 thereto by resin which has been forced by centrifugal force between a cylindrical portion 93a of the end cap telescoped within the cylinder of glass 12.

To form a tank two fiber glass sections as shown in Figure 9 are used which are sealingly joined. At the right end of the cylinder a rib 111 formed in the same manner as ribs 13 is bonded to and partially embedded in the fiber glass cylinder during molding of the fiber glass tube as previously described. After molding of the fiber glass tube a plurality of circumferentially spaced semicircular slots 112 are cut therein. Also holes 113 are bored adapted to receive studs 114 threaded at each end. A circular end groove formed therein is adapted to receive an O ring 116 forming a seal between the sections. After the sections have their end faces in aligned abutting position they are locked together by nuts 117 engaging studs 114.

Although we have shown two end cap sections sealingly joined to form a tank it is understood that one or more tube sections as illustrated in Figure 1 can be disposed between a pair of end cap sections and all the sections can be sealingly joined as illustrated in Figure 7.

It will now be understood that we have disclosed a method and apparatus for forming a fiber glass tube or fiber glass tank which has high strength internal ribs formed of fiber glass inter-locked therewith during molding or forming of the tube or tank section. We have found that after a fiber glass tube of the above type is molded a satisfactory joint between the tube and fiber glass ribs or a fiber glass end cap cannot be effected due to the tendency of any suitable bonding agent to shrink as it hardens and to effect a suitable joint the ribs should be embedded in the tube to some degree.

Although we have shown and described preferred forms of the invention we contemplate that numerous and extensive departures may be made therefrom without departing from the spirit of the invention and the scope of the appended claims.

What we claim:

1. Apparatus for forming a fiber glass tube and concurrently bonding internal fiber glass ribs thereto in interlocking relationship, said apparatus comprising a rotatable tubular mold adapted to have fiber glass mat in generally cylindrical form telescoped therein and compacted by rotation of the mold, a generally cylindrical guide sheath having a plurality of flexible fingers adapted to contact the inner wall of the compacted mat, means for moving said sheath axially of the mold, a rib carrier adapted to have a rib positioned thereon and moved axially to dispose the rib at a desired location within the sheath, means for locking the rib carrier against axial movement while the sheath is withdrawn thereby permitting a seated rib to make pressure contact with the mat, means for locking the sheath against axial movement while the rib carrier is withdrawn to seat another rib, means on the rib carrier for maintaining a rib in contact with the mat spaced a predetermined distance from a seated rib when the carrier is locked in position, means for completely withdrawing the guide sheath and rib carrier from the mold when a desired number of ribs are positioned, means for feeding liquid resin to the mat during mold rotation, and means for applying heat to the mat during tube rotation to harden the resin.

2. Apparatus for making a resin-bonded fiber glass tube which comprises a cylindrical mold to receive a cylindrical fiber glass mat telescoped within said mold, a cylindrical guide sheath telescoped within said cylindrical mat, said sheath comprising flat metal strips substantially the length of the mold and disposed longitudinally within the cylindrical mat to form an expansible liner for the cylindrical mat, one end portion of each of said strips projecting from one end of said mold, each of said projecting end portions flaring outwardly to form an entrance mouth at said one end of the mold, a rib carrier comprising a plunger having a circular head and a shaft extending from the head at one side thereof, said head having an annular rib seat formed at the periphery of the head on that side thereof remote from the shaft to receive a reinforcing rib, means to move the rib carrier into the sheath to position a rib longitudinally within the sheath, means to withdraw the sheath from the mold while said rib is held in position and is engaged with the inner wall of said cylindrical mat.

3. Apparatus for making a resin-bonded fiber glass tube which comprises a cylindrical metal mold to receive a cylindrical fiber glass mat telescoped within said mold, a cylindrical guide sheath telescoped within said cylindrical mat, said sheath comprising spaced flat metal strips substantially the length of the mold and disposed longitudinally within the cylindrical mat to form a flexible liner for the cylindrical mat, one end portion of each of said strips projecting from one end of said mold each of said projecting end portions flaring outwardly to form an entrance mouth at said one end of the mold, said outwardly flaring portions being connected to a ring, a rib carrier comprising a plunger having a head and a shaft extending from the head at one side thereof, said head being smaller in diameter than the sheath, said head having an annular rib seat formed at the periphery of the head on that side thereof remote from the shaft to receive a reinforcing rib means to move the rib carrier axially into the mold to position said rib within the sheath, means to withdraw the sheath axially from the mold while said rib is held in position and is engaged with the inner wall of said cylindrical mat, and means to maintain a plurality of said ribs spaced in said cylindrical mat during the introduction of resin.

4. Apparatus for making a resin-bonded fiber glass tube which comprises a cylindrical metal mold to receive a cylindrical fiber glass mat telescoped within said mold and arranged to bear against the inner wall of the mold, a sheath having a circular ring portion at one end of said mold, said ring portion having a plurality of flat metal strips secured thereto and extending therefrom longitudinally along the interior of said cylindrical fiber glass mat, the end portions of said flat strips being flared outwardly where said portions are secured to said ring, a rib carrier comprising a plunger shaft having a head at one end thereof, said head having a circular periphery of a diameter less than the inner diameter of said sheath to receive a reinforcing rib on that face of the head away from the plunger shaft, said rib being circumferentially continuous and proportioned to extend beyond the periphery of the head and bear against the flat metal strips of the sheath, means to move the rib carrier and the rib positioned thereon into said mold and locate said rib within said cylindrical mat intermediate the ends thereof, means to withdraw the sheath from the mat and mold, and locking means on the rib carrier to hold the said reinforcing rib in its located position during the withdrawal of the sheath to bring the inner surface of the mat into engagement with the reinforcing rib.

5. Apparatus for making a resin-bonded fiber glass tube which comprises a cylindrical metal mold to receive a cylindrical fiber glass mat telescoped within said mold and arranged to bear against the inner wall of the mold, a sheath comprising a circular ring portion at one end of said mold, a plurality of flat metal strips secured to said ring and extending therefrom longitudinally along the interior of said cylindrical fiber glass mat, the end portions of said flat strips being flared outwardly where secured to said ring to form an entrance mouth, a rib carrier comprising a plunger shaft having a head at one end thereof to receive a circumferentially continuous reinforcing rib, said rib proportioned to extend beyond the periphery of the head and push the flat metal strips of the sheath into the mat, means to move the rib carrier and the rib thereon into said entrance mouth and longitudinally of the mold to locate said rib within said cylindrical mat intermediate the ends thereof, and means to withdraw the sheath from the cylindrical mat, means to hold the rib carrier in its said locating position during the withdrawal of the sheath whereby the inner surface of the mat contacts into engagement with the reinforcing rib and means to introduce resin and cure the resin in said mold.

References Cited in the file of this patent

UNITED STATES PATENTS

| | | |
|---|---|---|
| 2,133,019 | Campbell | Oct. 11, 1938 |
| 2,479,350 | Haggart | Aug. 16, 1949 |
| 2,739,917 | Schulze | Mar. 27, 1956 |
| 2,749,266 | Eldred | June 5, 1956 |
| 2,783,174 | Stephens | Feb. 26, 1957 |
| 2,785,442 | Boggs | Mar. 19, 1957 |